United States Patent
Triller et al.

(10) Patent No.: US 7,909,723 B2
(45) Date of Patent: Mar. 22, 2011

(54) ADJUSTING DEVICE WITH A CVT PLANETARY ROLLER TRANSMISSION

(75) Inventors: Andreas Triller, Bühl (DE); Andreas Englisch, Bühl (DE); Andreas Götz, Rastatt (DE); Lászlo Mán, Ottersweier-Unzhurst (DE); Marco Grethel, Bühlertal (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 549 days.

(21) Appl. No.: 12/011,213

(22) Filed: Jan. 24, 2008

(65) Prior Publication Data

US 2008/0261747 A1    Oct. 23, 2008

Related U.S. Application Data

(60) Provisional application No. 60/897,113, filed on Jan. 24, 2007.

(51) Int. Cl.
*F16H 15/48* (2006.01)
*F16H 13/08* (2006.01)

(52) U.S. Cl. ........................................ 475/189; 475/196

(58) Field of Classification Search .............. 475/5, 149, 475/150, 183, 185, 189, 190, 191, 193, 196, 475/197; 476/36, 38, 39, 40, 51, 50

See application file for complete search history.

(56) References Cited

U.S. PATENT DOCUMENTS

| | | | | |
|---|---|---|---|---|
| 3,452,622 | A * | 7/1969 | Manabu | 475/189 |
| 4,744,261 | A * | 5/1988 | Jacobson | 475/189 |
| 7,011,600 | B2 * | 3/2006 | Miller et al. | 476/36 |
| 7,086,981 | B2 * | 8/2006 | Ali et al. | 475/210 |
| 7,166,052 | B2 * | 1/2007 | Miller et al. | 475/189 |
| 7,540,818 | B2 * | 6/2009 | Miller et al. | 475/5 |
| 2009/0215570 | A1 * | 8/2009 | Triller et al. | 475/191 |

* cited by examiner

Primary Examiner — Roger Pang
(74) Attorney, Agent, or Firm — Alfred J. Mangels

(57) ABSTRACT

An adjusting device including a CVT planetary roller transmission having two axially-spaced sun wheels that are rotatable about a common axis of rotation and at different speeds of rotation. Planet wheels contact and ride against peripheral surfaces of each of the sun wheels, and an axially displaceable ring wheel lies radially outwardly of the sun wheels and engages a peripheral groove formed in the sun wheels. When the ring wheel is axially displaced relative to the sun wheels the axes of rotation of the planet wheels tilt relative to the sun wheel axis resulting in a difference in the rotational speed of the sun wheels changes. The device can be employed as an adjusting device for adjusting the rotational speed of connected units, and also as a drive line component having a variable transmission ratio and situated in a power train of a motor vehicle.

3 Claims, 9 Drawing Sheets

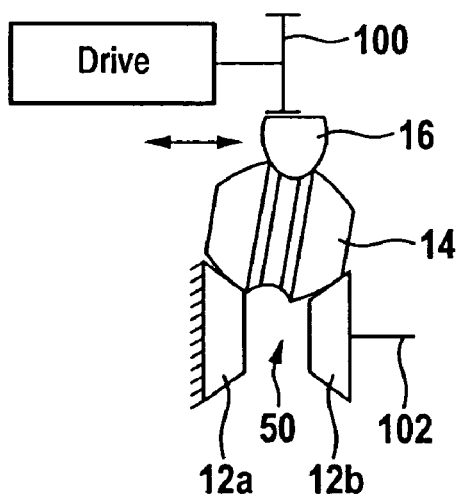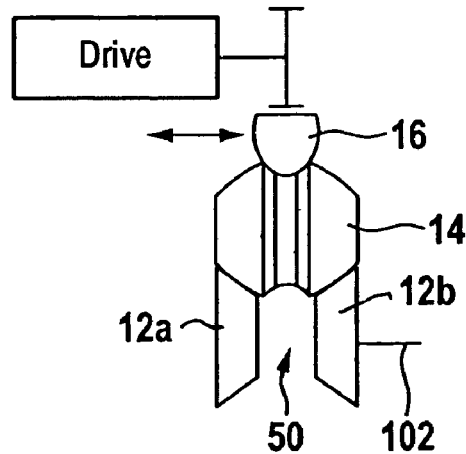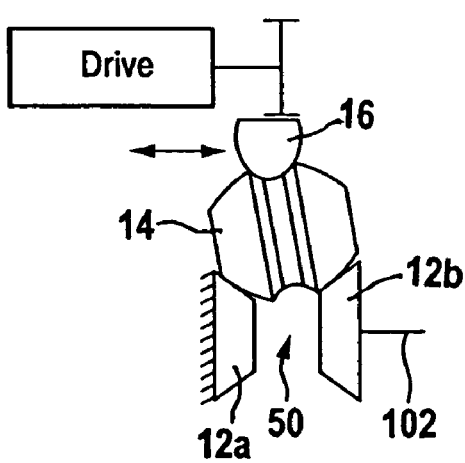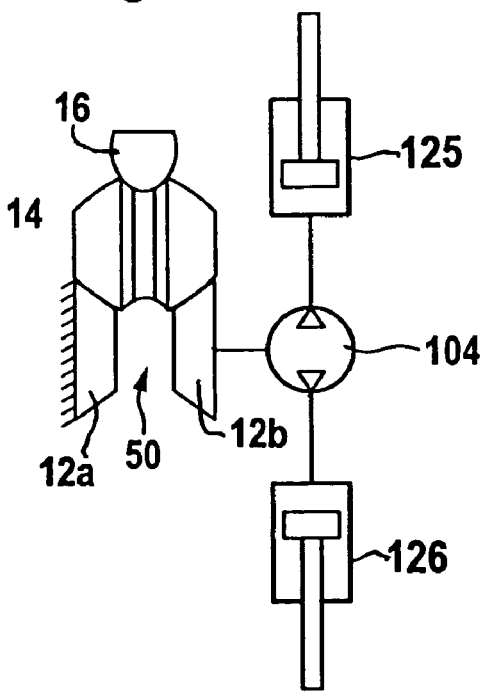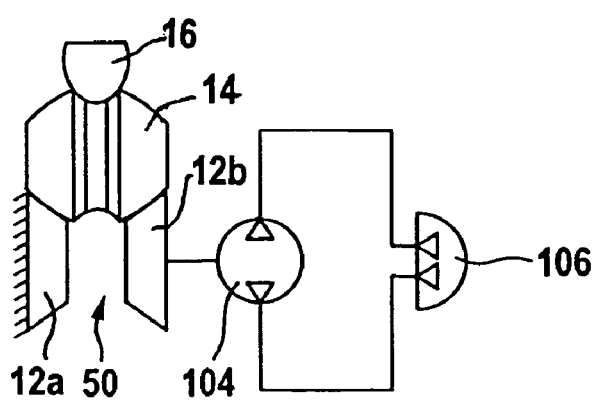

ADJUSTING DEVICE WITH A CVT PLANETARY ROLLER TRANSMISSION

BACKGROUND OF THE INVENTION

1. Field of the Invention

The present invention relates to an adjusting device with a CVT planetary roller transmission.

2. Description of the Related Art

In particular in motor vehicles, due to the increasing automation of the power train, adjusting devices are needed for a great variety of purposes, for example to actuate a clutch, to change the transmission ratio of a transmission having a continuously variable transmission ratio, to drive ancillary units such as generators, fluid pumps, etc.

An object of the present invention is to provide an adjusting device, particularly for motor vehicle power trains, which enables continuous adjustment of a particular unit.

Common to all of the adjusting devices in accordance with the present invention is a CVT planetary roller transmission with which continuous variation of a rotary transmission ratio is possible, which is either used directly or is usable to adjust a positioning element.

SUMMARY OF THE INVENTION

A first adjusting device in accordance with the present invention includes a CVT planetary roller transmission which has two sun wheels that are axially spaced from each other and are rotatable about the same axis of rotation at different speeds, and each having sun wheel outer peripheral surfaces. A ring wheel is provided having a radially inner peripheral surface, and planet wheels with planet wheel peripheral surfaces that are in frictional contact with the inner peripheral surface of the ring wheel and with the sun wheel peripheral surfaces. The surfaces that are in frictional contact with each other are so shaped that when there is an axial shift of the ring wheel relative to the sun wheels and an accompanying tilting of the axes of rotation of the planet wheels, a difference in speed of rotation between the sun wheels changes. An actuator is provided for axially shifting the ring wheel and a positioning element that is rotatable about the same axis as one of the sun wheels, which is coupled to that sun wheel via an axial drive in such a way that it is shifted axially when it rotates relative to the sun wheel.

When the adjusting device in accordance with the invention is used to actuate a clutch, a clutch lever that sets the clutch torque of a friction clutch bears against an actuating element which relates to one of the sun wheels in a way that transmits axial force, which actuating element additionally relates to the positioning element that is coupled to the other sun wheel in a manner that transmits axial force.

The clutch lever advantageously bears against the actuating element at a place that is situated between the places at which the actuating element bears against the clutch lever and against the positioning element.

Advantageously the ring wheel is held so that it cannot rotate, the first sun wheel is rotationally driven by a drive engine, and the second sun wheel is coupled through the axial drive to the positioning element, whose position changes a clamping force with which an endless torque-transmitting means of a belt-driven conical-pulley transmission with continuously variable transmission ratio bears against a conical pulley.

In another embodiment of the adjusting device in accordance with the present invention the ring wheel is held so that it cannot rotate, the first sun wheel is rotationally driven by a drive engine, and the second sun wheel is coupled through the axial drive to the positioning element, whose position changes the transmission ratio of a CVT planetary roller transmission.

Another embodiment of an adjusting device in accordance with the present invention includes a CVT planetary roller transmission which has two sun wheels that are axially spaced from each other and are rotatable about the same axis of rotation at different speeds, and each having sun wheel outer peripheral surfaces. A ring wheel is provided having a radially inner peripheral surface, and planet wheels with planet wheel peripheral surfaces that are in frictional contact with the inner peripheral surface of the ring wheel and with the sun wheel peripheral surfaces. The surfaces that are in frictional contact with each other are so shaped that when there is an axial shift of the ring wheel relative to the sun wheels and an accompanying tilting of the axes of rotation of the planet wheels, a difference in speed of rotation between the sun wheels changes. The ring wheel is held so that it cannot rotate and is axially immovable, the first sun wheel is rotationally driven and is subjected to an axial force directed at the second sun wheel, and the second sun wheel drives a fluid pump and is subjected to an axial force in the direction of the first sun wheel by a piston-cylinder unit that is under the pressure of the fluid transported by the fluid pump.

Another embodiment of an adjusting device in accordance with the present invention includes a CVT planetary roller transmission which has two sun wheels that are axially spaced from each other and are rotatable about the same axis of rotation at different speeds, and each having sun wheel outer peripheral surfaces. A ring wheel is provided having a radially inner peripheral surface, and planet wheels with planet wheel peripheral surfaces that are in frictional contact with the inner peripheral surface of the ring wheel and with the sun wheel peripheral surfaces. The surfaces that are in frictional contact with each other are so shaped that when there is an axial shift of the ring wheel relative to the sun wheels and an accompanying tilting of the axes of rotation of the planet wheels, a difference in speed of rotation between the sun wheels changes. The ring wheel is rotationally driven and is axially movable by an actuator, the first sun wheel is held so that it cannot rotate, and the second sun wheel is non-rotatably connected to an output shaft.

Another embodiment of the adjusting device in accordance with the present invention includes a CVT planetary roller transmission which has two sun wheels that are axially spaced from each other and are rotatable about the same axis of rotation at different speeds, and each having sun wheel outer peripheral surfaces. A ring wheel is provided having a radially inner peripheral surface, and planet wheels with planet wheel peripheral surfaces that are in frictional contact with the inner peripheral surface of the ring wheel and with the sun wheel peripheral surfaces. The surfaces that are in frictional contact with each other are so shaped that when there is an axial shift of the ring wheel relative to the sun wheels and an accompanying tilting of the axes of rotation of the planet wheels, a difference in speed of rotation between the sun wheels changes. The ring wheel is held so that it cannot rotate and is axially movable by an actuator, the first sun wheel is rotationally driven and the second sun wheel drives an output shaft through a transmission that includes a shiftable reversing set to reverse the direction of rotation of the output shaft.

Another adjusting device in accordance with the present invention includes a CVT planetary roller transmission which has two sun wheels that are axially spaced from each other and are rotatable about the same axis of rotation at different speeds, and each having sun wheel outer peripheral surfaces.

A ring wheel is provided having a radially inner peripheral surface, and planet wheels with planet wheel peripheral surfaces that are in frictional contact with the inner peripheral surface of the ring wheel and with the sun wheel peripheral surfaces. The surfaces that are in frictional contact with each other are so shaped that when there is an axial shift of the ring wheel relative to the sun wheels and an accompanying tilting of the axes of rotation of the planet wheels, a difference in speed of rotation between the sun wheels changes. The first sun wheel is rotationally drivable by a drive engine, the ring wheel is axially movable by an actuator and rotationally drivable by an electric motor, and the second sun wheel rotationally drives an output shaft.

In the above-identified embodiment of the adjusting device in accordance with the present invention a clutch can be positioned between the drive engine and the first sun wheel.

In addition, the rotation of the ring wheel and of the electric motor can be blockable.

Another embodiment of the adjusting device in accordance with the present invention includes a CVT planetary roller transmission which has two sun wheels that are axially spaced from each other and are rotatable about the same axis of rotation at different speeds, and each having sun wheel outer peripheral surfaces. A ring wheel is provided having a radially inner peripheral surface, and planet wheels with planet wheel peripheral surfaces that are in frictional contact with the inner peripheral surface of the ring wheel and with the sun wheel peripheral surfaces. The surfaces that are in frictional contact with each other are so shaped that when there is an axial shift of the ring wheel relative to the sun wheels and an accompanying tilting of the axes of rotation of the planet wheels, a difference in speed of rotation between the sun wheels changes. The first sun wheel of a first CVT planetary roller transmission is rotationally drivable by a drive engine, the second sun wheel of the first CVT planetary roller transmission is connected in a rotationally fixed connection to the first sun wheel of a second CVT planetary roller transmission, whose second sun wheel drives an output shaft, the second sun wheel of the first CVT planetary roller transmission and the first sun wheel of the second CVT planetary roller transmission are non-rotatably connected to an electric motor, and the ring wheels of the CVT planetary roller transmissions are held by at least one actuator so that they cannot rotate and are axially movable.

Another embodiment of the adjusting device in accordance with the present invention includes a CVT planetary roller transmission which has two sun wheels that are axially spaced from each other and are rotatable about the same axis of rotation at different speeds, and each having sun wheel outer peripheral surfaces. A ring wheel is provided having a radially inner peripheral surface, and planet wheels with planet wheel peripheral surfaces that are in frictional contact with the inner peripheral surface of the ring wheel and with the sun wheel peripheral surfaces. The surfaces that are in frictional contact with each other are so shaped that when there is an axial shift of the ring wheel relative to the sun wheels and an accompanying tilting of the axes of rotation of the planet wheels, a difference in speed of rotation between the sun wheels changes. The first sun wheel is rotationally drivable by a drive engine, the ring wheel is held so that it cannot rotate and is axially movable by an actuator, the second sun wheel is non-rotatably connected to the ring wheel of a second CVT planetary roller transmission, the rotationally fixed connection is connected in a rotationally fixed connection to an electric motor, the ring wheel of the second CVT transmission is movable by an actuator, and the second sun wheel of the second CVT transmission rotationally drives an output shaft.

Another embodiment of the adjusting device in accordance with the present invention includes a CVT planetary roller transmission which has two sun wheels that are axially spaced from each other and are rotatable about the same axis of rotation at different speeds, and each having sun wheel outer peripheral surfaces. A ring wheel is provided having a radially inner peripheral surface, and planet wheels with planet wheel peripheral surfaces that are in frictional contact with the inner peripheral surface of the ring wheel and with the sun wheel peripheral surfaces. The surfaces that are in frictional contact with each other are so shaped that when there is an axial shift of the ring wheel relative to the sun wheels and an accompanying tilting of the axes of rotation of the planet wheels, a difference in speed of rotation between the sun wheels changes. The first sun wheel is held so that it cannot rotate, the ring wheel is rotationally drivable by a drive engine and an electric motor, the second sun wheel is non-rotatably connected to the first sun wheel of a second CVT planetary roller transmission whose ring wheel is held so that it cannot rotate and is axially movable by means of an actuator and whose second sun wheel rotationally drives an output shaft.

The above-identified adjusting devices in accordance with the present invention can be used for a great variety of application purposes in which continuous adjustment of the operation of a unit is necessary.

Especially advantageously, an adjusting device is used in a vehicle power train to adjust the operation of a unit.

Embodiments of the above-identified adjusting devices in a vehicle power train with an adjusting device situated between a vehicle drive engine and an output shaft for driving a vehicle wheel can form a vehicle transmission with variable transmission ratio.

BRIEF DESCRIPTION OF THE DRAWINGS

The structure, operation, and advantages of the present invention will become further apparent upon consideration of the following description, taken in conjunction with the accompanying drawings in which:

FIGS. 10 through 12 are schematic views of an arrangement including a CVT planetary roller transmission for adjusting the transmission ratio and reversing the direction of rotation of an output shaft;

FIGS. 13 and 14 are schematic views showing the arrangement of FIGS. 10 through 12 as used to drive a pump;

DESCRIPTION OF THE PREFERRED EMBODIMENTS

Figure 1:
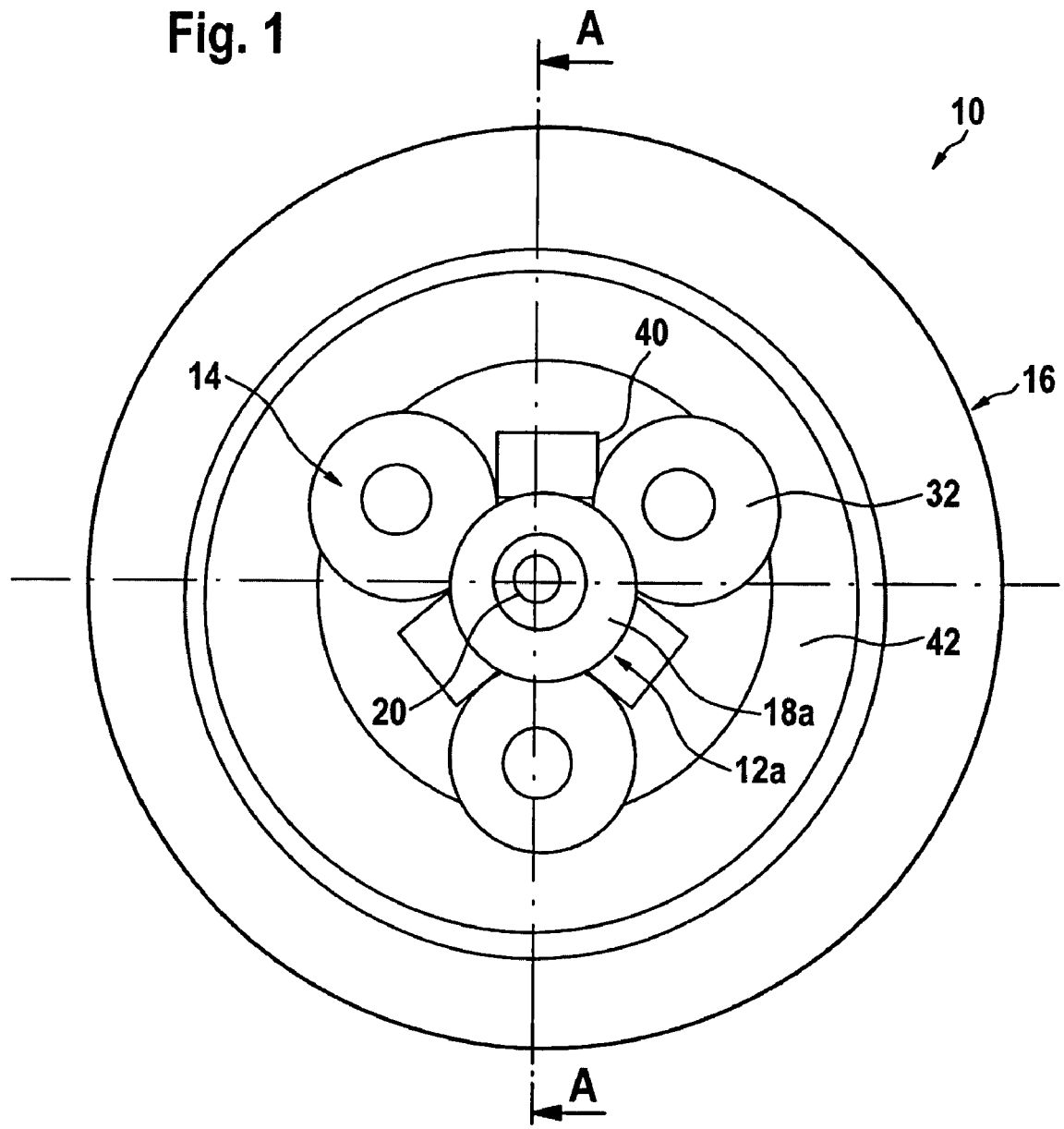
FIG. 1 is a side view of a CVT planetary roller transmission.
Figure 2:
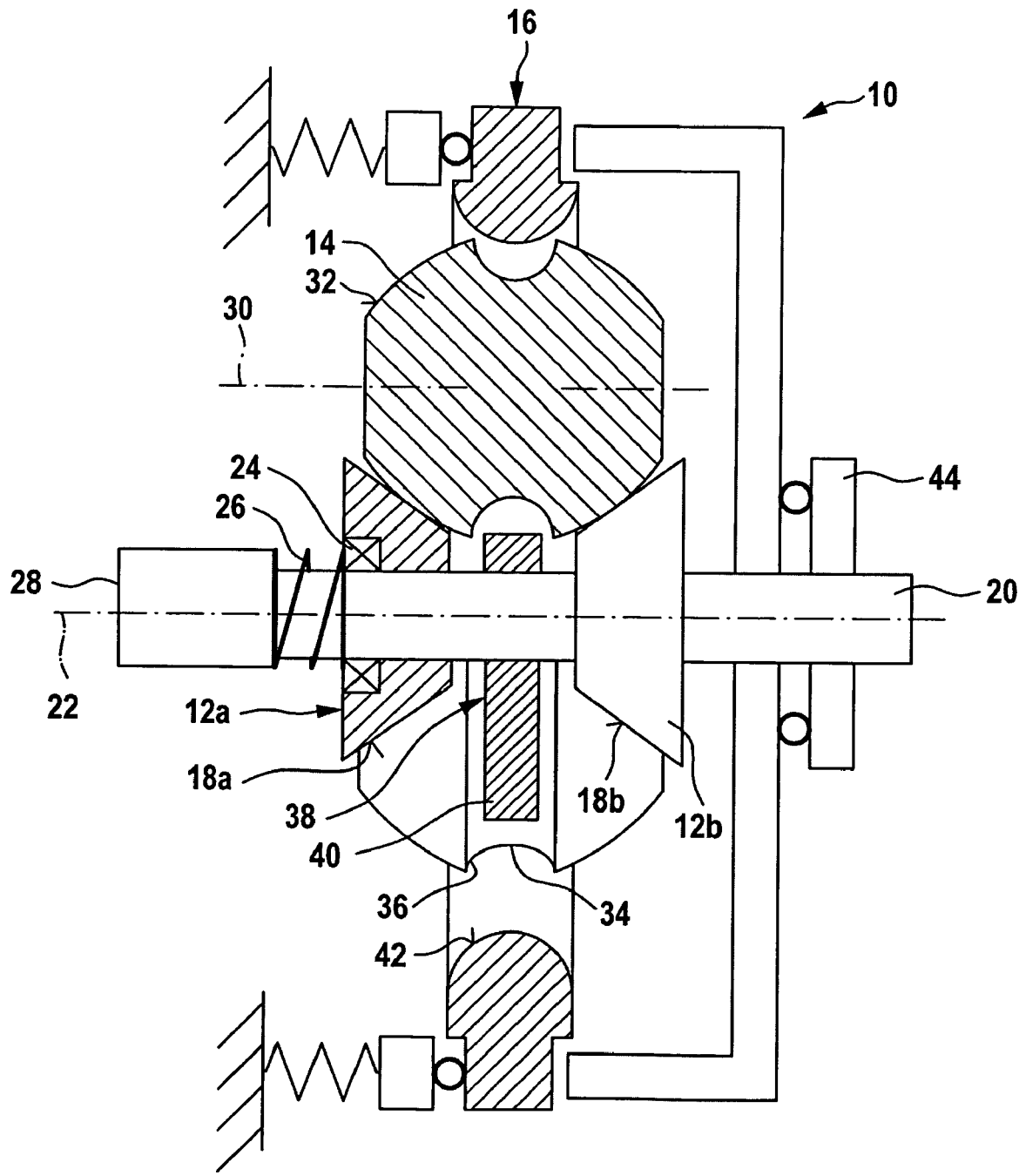
FIG. 2 is a longitudinal cross-sectional view of the transmission in accordance with FIG. 1, taken along the line A-A of FIG. 1.
Figure 3:
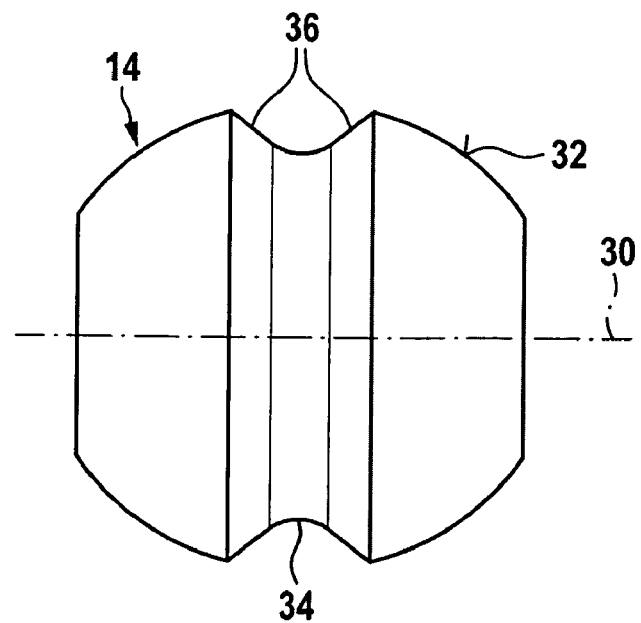
FIG. 3 is an enlarged side view of a planet wheel of the transmission shown in FIG. 1.

In accordance with FIGS. 1 and 2, a CVT planetary roller transmission, i.e., a planetary roller transmission with continuously variable transmission ratio, includes two sun wheels 12a, 12b, three planet wheels 14 and one ring wheel 16. Sun wheels 12a, 12b taper toward their sides facing each other, so that their sun wheel peripheral surfaces 18a, 18b are in the shape of a truncated circular cone. The contour line of sun wheel peripheral surfaces 18a, 18b is a straight line in the illustrated example. Sun wheels 12a, 12b are situated at an axial distance from each other on a shaft 20 having an axis of rotation 22. One sun wheel 12a is axially movable relative to shaft 20, and is rotatable relative to shaft 20 by means of a bearing 24, for example a ball bearing. The other sun wheel 12b is rigidly attached to shaft 20.

A spring 26 is propped between sun wheel 12a and a shoulder 28 of shaft 20, and presses sun wheel 12a in the axial direction into contact against planet wheels 14.

Planet wheels 14 each have an axis of rotation 30 and taper starting from a central area toward their faces, so that their planet wheel peripheral surfaces 32 are substantially in the shape of a circular cone. In the example illustrated, the contour lines of the planet wheel peripheral surfaces 32 are convexly curved. Planet wheels 14 have a circumferential groove 34 with rounded flanks 36 between the planet wheel peripheral surfaces 32. Planet wheels 14 are situated coaxially to shaft 20, and each have one of their planet wheel peripheral surfaces 32 in frictional contact with one of the sun wheel peripheral surfaces 18a, 18b.

Projections 40 of a star-shaped separator element 38 rotatably situated on shaft 20 extend into intermediate spaces between the planet wheels 14 and into the grooves 34 of planet wheels 14, so that the planet wheels are held at the same circumferential spacing from each other.

Ring wheel 16 is advantageously an annular member and has a bulge in the form of a pointed arch with a convex cross section on its inner peripheral surface 42. Ring wheel 16 is situated concentrically to shaft 20. Inner peripheral surface 42 is in frictional contact with each flank 36 of groove 34.

The planet wheels 14 are held axially by the frictional contact of the planet wheel peripheral surfaces 32 with the sun wheel peripheral surfaces 18a, 18b and the inner peripheral surface 42 of ring wheel 16. When there is an axial movement of ring wheel 16 relative to sun wheels 12a, 12b, planet wheels 14 tilt relative to axis 22 of shaft 20. Planet wheel peripheral surfaces 32, groove 34 and inner peripheral surface 42 of ring wheel 16 are advantageously shaped so that in the tilted state the axes of rotation 30, the axis of rotation 22, and lines through the two points of the frictional contact of inner peripheral surface 42 with the flanks 36 of groove 34 intersect at a point SP (see FIG. 4). The result is a well-defined precessional movement of the planet wheels 14.

To move ring wheel 16 axially relative to shaft 20, a displacing device 44 (see FIG. 2) is situated around ring wheel 16. In the illustrated example, displacing device 44 is designed similarly to a clutch actuator, and is therefore not explained in greater detail.

Figure 4:
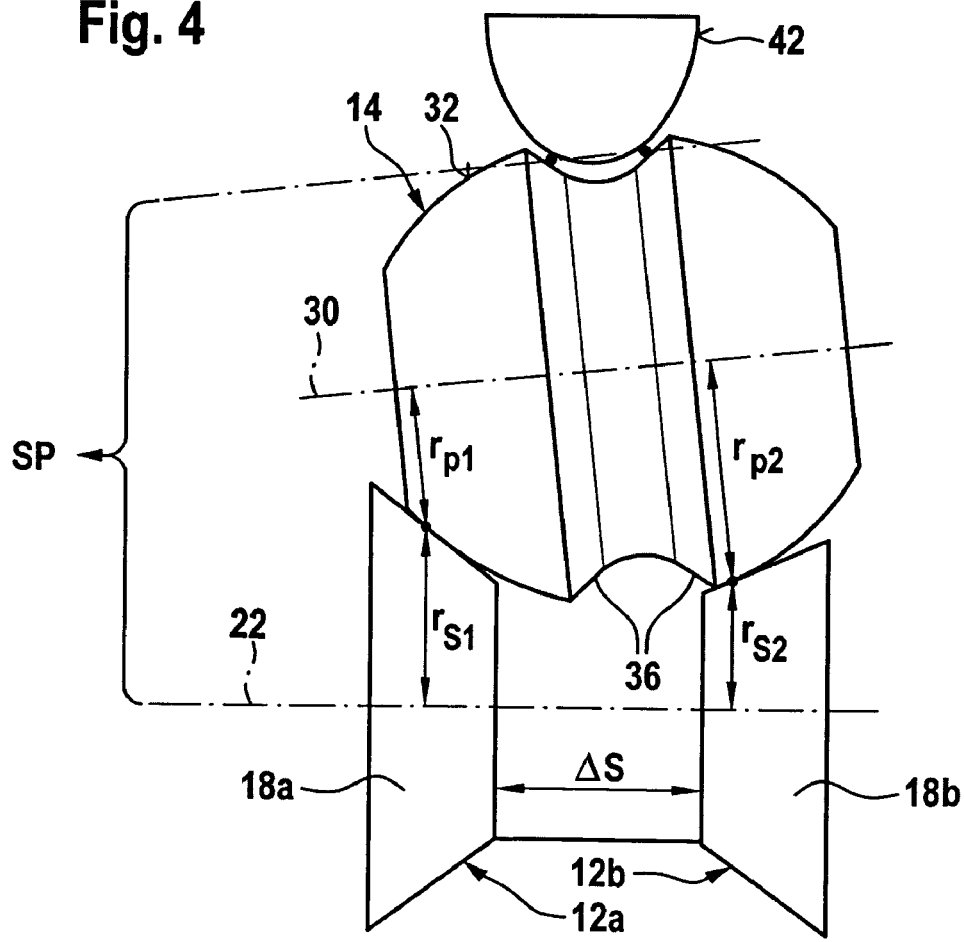
FIG. 4 is a side view of parts of the transmission shown in FIG. 1 to illustrate a change of transmission ratio.

The operating principle of the planetary transmission will be explained below on the basis of FIG. 4, based upon the following definitions:

$r_{s1}$ is the distance between axis of rotation 22 of shaft 20 and the point of frictional contact of sun wheel peripheral surface 18a with planet wheel peripheral surface 32;

$r_{s2}$ is the distance between axis of rotation 22 of shaft 20 and the point of frictional contact of sun wheel peripheral surface 18b with planet wheel peripheral surface 32;

$r_{P1}$ is the distance between axis of rotation 30 of planet wheel 14 and the point of frictional contact of planet wheel peripheral surface 32 with sun wheel peripheral surface 18a;

$r_{P2}$ is the distance between axis of rotation 30 of planet wheel 14 and the point of frictional contact of planet wheel peripheral surface 32 with sun wheel peripheral surface 18b;

$n_{s1}$ is the speed of rotation of sun wheel 12a;

$n_{s2}$ is the speed of rotation of sun wheel 12b;

$n_P$ is the speed of rotation of planet wheels 14; and $\Delta S$ is the axial distance of sun wheels 12a, 12b from each other.

In general, the following equation applies to the transmission of torque by planetary transmission 10:

$$n_{s1} \times r_{s1} = n_P \times r_{P1} \text{ and } n_{s2} \times r_{s2} = n_P \times r_{P2}$$

The description of the operating principle begins with the planet wheels 14 in a non-tilted condition. In that condition and with a symmetrical arrangement of the planetary transmission 10, the following equalities are true:

$$r_{s1} = r_{s2}; r_{P1} = r_{P2}, \text{ and therefore } n_{s1} = n_{s2}.$$

The transmission ratio I between drive and take-off is then i=1.

When ring wheel 16 is moved axially relative to sun wheels 12a, 12b, planet wheels 14 are carried along with it by virtue of contact with the flanks 36 of the grooves 34, and consequently the axes of rotation 30 of the planet wheels 14 are tilted relative to the axis of rotation 22 of the sun wheels 12a, 12b. If axis of rotation 30 is tilted toward sun wheel 12a, as shown in FIG. 4, then $r_{s1} > r_{s2}$ and $r_{P1} < r_{P2}$, i.e., $n_{s1} < n_{s2}$. If axis of rotation 30 is tilted toward sun wheel 12b, the relationships just stated above are accordingly reversed. The transmission ratio between $n_{s1}$ and $n_{s2}$ thus changes in accordance with the magnitude and direction of axial displacement of displacing device 44. At the same time, the transmission ratios between ring wheel 16 and each of the sun wheels 12a, 12b change in the opposite direction.

The conical outer surfaces 18a, 18b of sun wheels 12a, 12b can be formed so that the distance $\Delta S$ (see FIG. 5) between the opposed side faces of the sun wheels 12a, 12b remains constant when the axes of rotation 30 of the planet wheels 14 are tilted, i.e., when the transmission ratio is shifted. Contact pressure between the sun wheels 12a, 12b, the planet wheels 14, and the ring wheel 16 is ensured by the spring 26.

The CVT planetary roller transmission, as illustrated in its basic construction, can be modified in many ways. The sun wheels can differ in size. The contours of the peripheral surfaces can be concave, convex, or rectilinear, in coordination with each other.

The adjusting device can be designed in various ways.

The inner peripheral surface of the ring wheel can be in frictional contact with the planet wheel peripheral surfaces at only one point.

A planet wheel carrier whose supports extend from the carrier can be situated so that another gear can be engaged with it.

Spring 26 can be replaced by other biasing means.

As usual with planetary transmissions, first sun wheel 12a and ring wheel 16 can be used in different ways as inputs, with the shaft 20, which is connected to second sun wheel 12b in a rotationally fixed connection, serving as an output shaft.

Various applications and end uses of the described CVT planetary roller transmission will be explained below on the basis of FIGS. 5 through 21.

Figure 5:
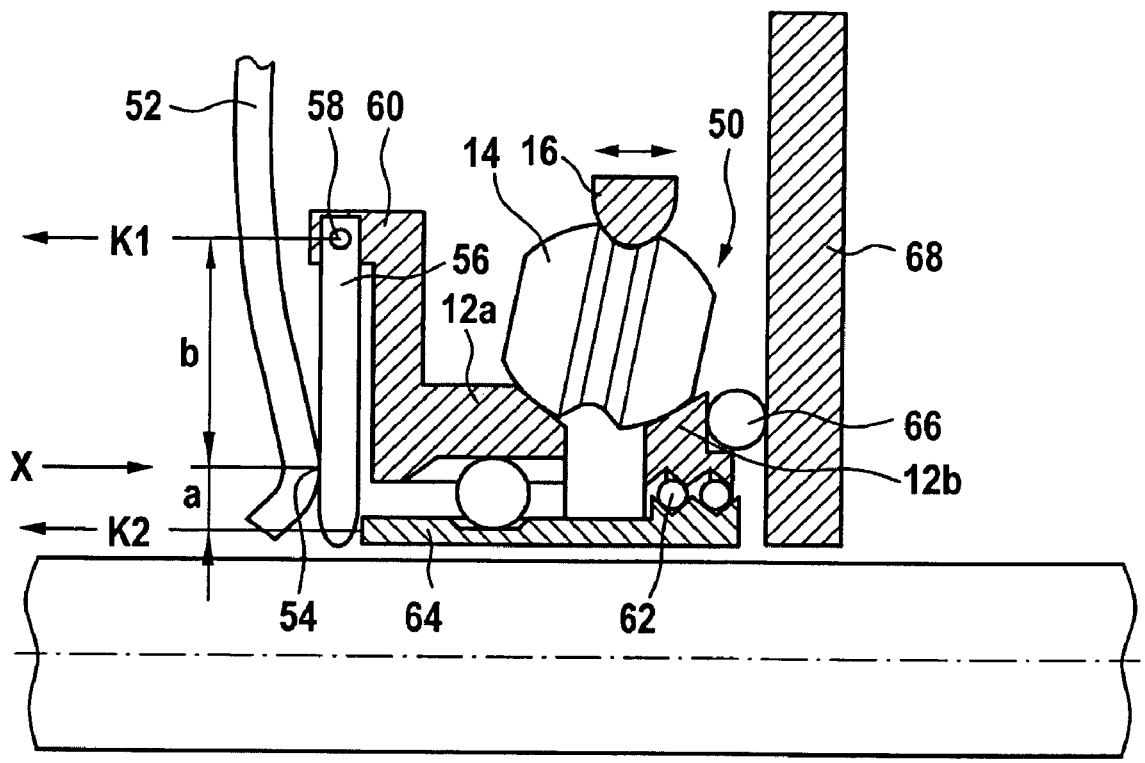
FIG. 5 is a longitudinal cross-sectional view through a system for use of a CVT planetary roller transmission to actuate a clutch.

FIG. 5 shows a half-sectional view through an embodiment of the planetary roller transmission, designated overall as 50, for actuating a friction clutch. A clutch lever 52, designed in a known manner as a diaphragm spring with radially inwardly projecting tongues, bears at a support point 54 against a lever-like actuator 56, which is pivotally attached at pivot 58 to a radially outer extension 60 of the first sun wheel 12a of planetary roller transmission 50. The ring wheel 16 of the planetary roller transmission is axially movable by means of a suitable actuator (not shown). The second sun wheel 12b is rotatable by a recirculating ball screw 62 relative to a sleeve-shaped positioning element 64, the positioning element being moved in one direction or the other in the axial direction when there is relative rotation between the second sun wheel 12b and the positioning element 64, depending upon the direction of the relative rotation. The end of the positioning element 64, which is on the left side of FIG. 5, bears against the actuator lever 56.

If the radial distance between support point 54 and pivot 58 is designated as b and the radial distance between support point 54 and the contact point between the positioning element 64 and the actuator lever 56 is designated as a, and the force applied by the clutch lever 52 to the actuator 56 is designated as X, the result is $K1=X \times b/(b+a)$ for the force K1 acting on the first sun wheel 12a, and $K2=X \times a/(a+b)$ for the force acting on the positioning element 64. The sleeve-shaped positioning element 64 is non-rotatably connected to the first sun wheel 12a and is axially movable relative thereto. The second sun wheel 12b is supported on a transmission bell housing 68 through a thrust bearing 66.

Corresponding to the division of the force X acting from the clutch lever 52 into the forces K1 and K2, a bias in the planetary roller transmission is set in such a way that a necessary torque can be transmitted. In the neutral position of ring wheel 16, in which the two sun wheels 12a and 12b do not turn relative to each other, positioning element 64 remains unchanged in its axial position. If the ring wheel is shifted axially, for example with a solenoid, the sun wheels rotate relative to each other and the positioning element 64 is moved in one or the other axial direction, depending upon the direction of the relative rotation. Depending upon the transmission ratio set between the two sun wheels with the help of the axial shifting of the ring wheel 16, the clutch is rapidly disengaged or engaged. The axial force transmitted by the actuator (not shown) to the ring wheel 16 can thus be increased as needed with the help of the planetary roller transmission 50, and the clutch can be controlled very precisely in accordance with need.

Figure 6:
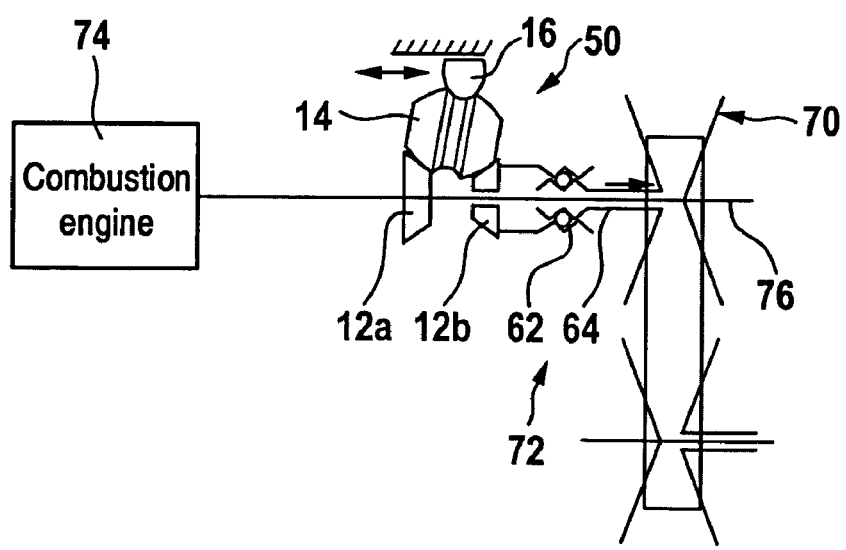
FIG. 6 is a schematic view of an arrangement for use of a CVT planetary roller transmission to change the contact pressure in a belt-driven conical-pulley transmission.

FIG. 6 shows a basic arrangement in which a CVT planetary roller transmission 50 is used to change the contact pressure with which conical places on a conical disk pair 70 are pressed against the endless torque-transmitting means of the belt-driven conical-pulley transmission 72. A drive engine 74, preferably an internal combustion engine, drives a shaft 76, to which the first sun wheel 12a of the planetary roller transmission 50 and one of the conical disks of the conical disk pair 70 are rigidly connected. However, the other conical disk of the conical disk pair 70 is connected to shaft 76 so that it is rotationally fixed but axially movable, and is coupled to the second sun wheel 12b through a recirculating ball screw 62. The ring wheel 16 of the planetary roller transmission 50 is held so that it is rotationally fixed and is movable in the direction of the double arrow by means of a suitable actuator (not shown). It is clearly evident that when the planet wheels are in the non-tilted position no shift occurs in the distance between the conical disks of the conical disk pair 70. Depending upon the tilting of the planet wheels to one position or the other, the distance between the conical disks of conical disk pair 70 becomes greater or smaller. With the help of the planetary roller transmission 50 employed as an adjusting device, the contact pressure can be precisely changed while significantly increasing the force applied by the actuator to the ring wheel 16.

Figure 7:
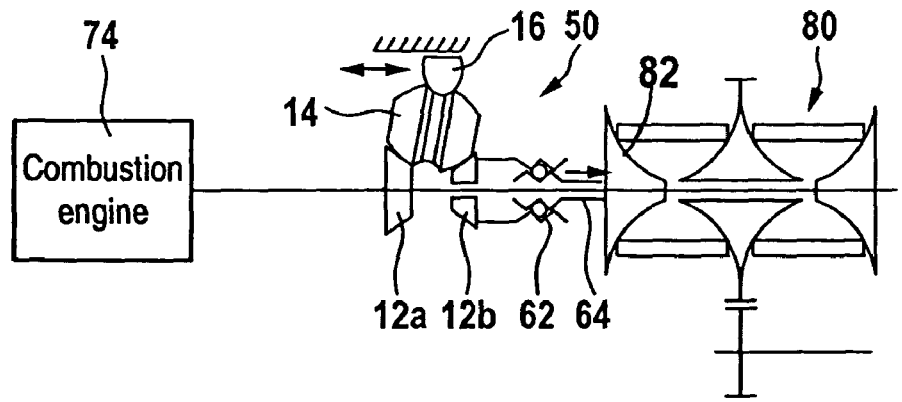
FIG. 7 is a schematic view of an arrangement in which a CVT planetary roller transmission is used to adjust the transmission ratio of a CVT transmission.

FIG. 7 shows an arrangement of a planetary roller transmission 50 similar to that of FIG. 6, with planetary roller transmission 50 being employed there to change the transmission ratio of a toroidal transmission 80. The adjustment of a toroidal body 82 is performed similarly to the adjustment of the axially movable conical disk of the arrangement shown FIG. 6, so that a detailed description is omitted.

Figure 8:
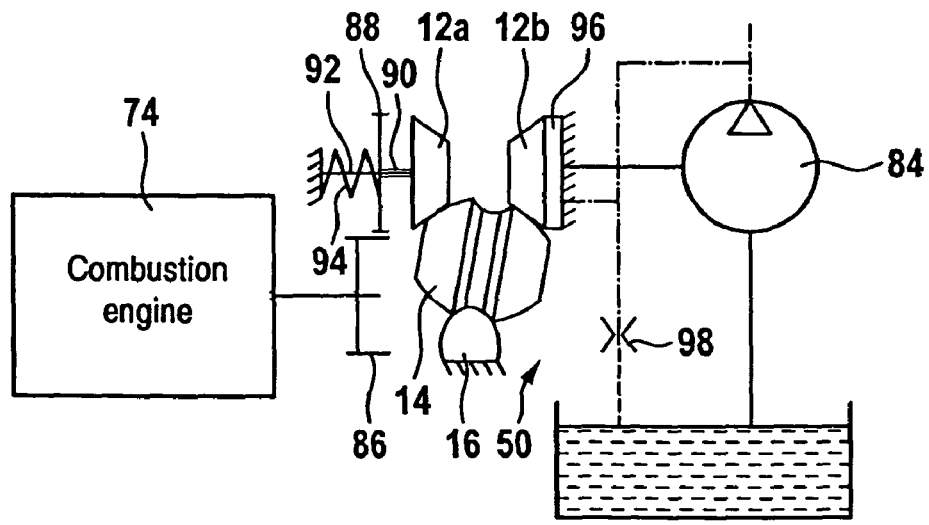
FIGS. 8 and 9 are schematic views of an arrangement in which a CVT planetary roller transmission is used to set the speed of rotation of a hydraulic pump as a function of the pump discharge pressure.
Figure 9:
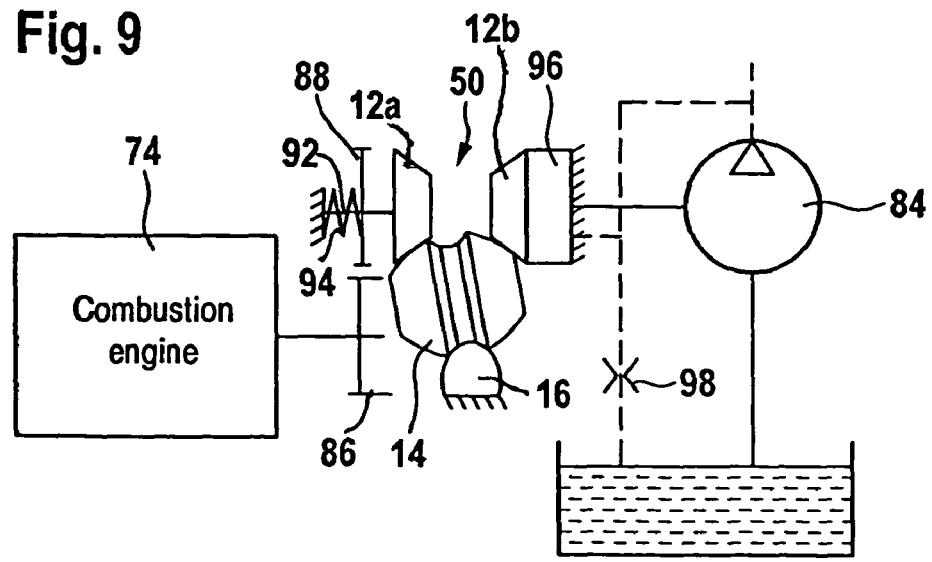

FIGS. 8 and 9 show a change of planetary roller transmission 50 to regulate the speed of rotation of a fluid pump 84 to transport a gaseous or liquid fluid.

Drive engine 74, preferably an internal combustion engine, is non-rotatably connected to a first gear 86 that engages with a second gear 88, which is rigidly connected through a sleeve 90 to the first sun wheel 12a of the planetary roller transmission 50. The sleeve 90 is rotatably supported on an axle 92. Second gear 88, which is axially movable relative to first gear 86, is elastically biased toward planet wheel 14 by a spring 94. Ring wheel 16 is held stationary.

Second sun wheel 12b is non-rotatably connected to an impeller of pump 84 and is axially biased in the direction of the first sun wheel 12a by means of a piston-cylinder unit 96, which is pressurized with pressure that exists in a return line leading from the discharge line of pump 84 to a fluid supply, in which return line a throttle 98 is situated.

At low pressure in the piston-cylinder unit 96, the planet wheels 14 are pivoted into the position shown FIG. 8, so that second sun wheel 12b rotates at a higher speed than first sun wheel 12a. If the pressure in piston-cylinder unit 96 increases, the planet wheels 14 are increasingly pivoted into the position shown in FIG. 9, in which the speed of rotation of first sun wheel 12b, and hence the speed of rotation of the pump, is reduced. Pump 84 can be, for example, the lubricant pump of an internal combustion engine, or a supply pump for hydraulically operated units. The system pressure is adjustable by means of the bias of spring 94.

FIGS. 10 through 12 show the use of a planetary roller transmission 50 as a reversing transmission. There the ring wheel 16 is driven by a rotationally driven gear 100, where the engagement between ring wheel 16 and gear 100 permits a shifting of ring wheel 16 relative to gear 100 in the direction of the double arrow by means of an actuator (not shown). First sun wheel 12a is held so that it cannot rotate. Second sun wheel 12b is non-rotatably connected to an output shaft 102.

In the neutral (non-tilted) position of the planet wheels 14, output shaft 102 does not rotate, corresponding to the stationary first sun wheel 12a (see FIG. 11). If ring wheel 16 is moved axially relative to axis 22 of the planetary roller transmission (see FIG. 10), the output shaft rotates in one direction, for example the forward direction. If ring wheel 16 is moved in the other direction, output shaft 102 rotates in the opposite direction, for example the reverse direction (see FIG. 12).

FIG. 13 shows an arrangement of planetary roller transmission 50 for a reversing pump 104 to drive two oppositely acting piston-cylinder units 125, 126.

FIG. 14 shows the application of a planetary roller transmission 50 in an arrangement in accordance with FIG. 13 for a reversing pump 104 that drives an oscillating motor 106.

The remaining drawing figures show CVT planetary roller transmissions in which the planetary roller transmission 50 is situated in the torque transmission path from a drive engine to the driven wheels of a vehicle, i.e., it forms at least part of the vehicle drive train.

Figure 15:
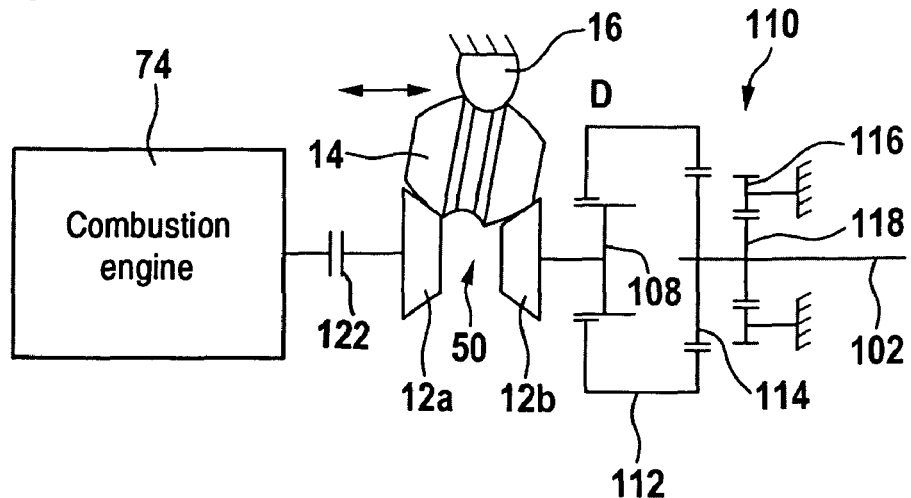
FIGS. 15 and 16 are schematic views of an arrangement including a CVT planetary roller transmission for adjusting a transmission ratio, followed by a planetary transmission for reversing a direction of rotation.
Figure 16:
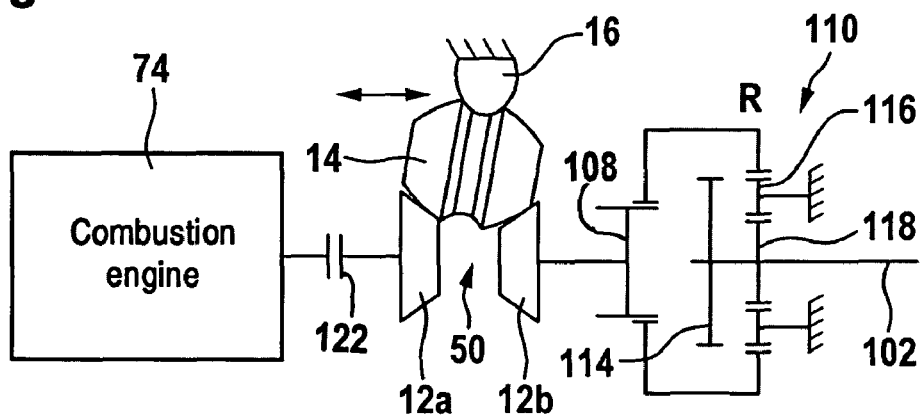

FIGS. 15 and 16 illustrate how a drive train can be realized that includes a planetary roller transmission 50 to change the transmission ratio of a transmission 110, and in addition permits reversal between forward and reverse.

As shown in FIG. 15, a drive engine 74, preferably an internal combustion engine, is connected through a clutch 122 to the first sun wheel 12a of a planetary roller transmission 50. Ring wheel 16 of the planetary roller transmission 50 is held so that it cannot rotate, but is axially movable by means of a suitable actuator (not shown). The transmission ratio between the speed of rotation of the first sun wheel 12a and the second sun wheel 12b is changeable by moving ring wheel 16 axially. Second sun wheel 12b is operatively connected to a downstream transmission 110 by an input gear 108 that is non-rotatably connected with second sun wheel 12b. A ring wheel 112 designed with two sets of inner teeth that are at different radial positions meshes with input gear 108, and in the position shown in FIG. 15 with first output gear 114, which is non-rotatably connected to an output shaft 102. Ring wheel 112 is axially movable by means of a suitable actuator (not shown), so that in a position in which it has been moved to the right (see FIG. 16) it continues to mesh with gear 108 but no longer with first output gear 114, but instead with planet gears 116, whose carrier is held stationary and which mesh with second output gear 118, which is non-rotatably connected to output shaft 102.

The condition shown in FIG. 15 corresponds to rotation of output shaft 102 for forward travel of the vehicle. The condition shown with FIG. 16 corresponds to rotation of output shaft 102 for reverse travel of the vehicle.

Figure 17:
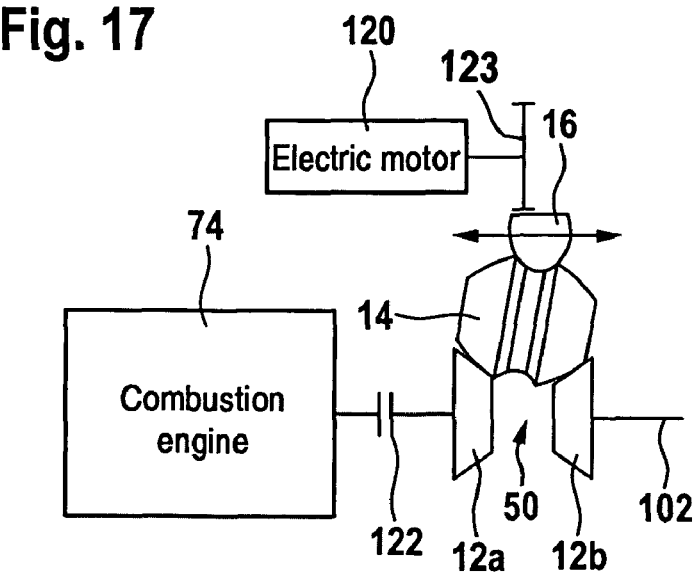
FIGS. 17 through 21 are schematic views of various arrangements including one or two CVT planetary roller transmissions in a hybrid power train of a vehicle.
Figure 18:
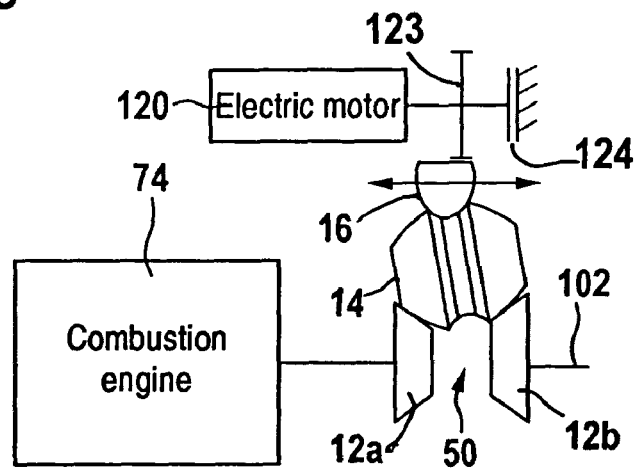

FIGS. 17 and 18 show a utilization of the CVT planetary roller transmission 50 in a power-branched hybrid power train with a drive engine 74, preferably an internal combustion engine, and an electric motor 120 that is preferably operable both as an electric motor and as a generator. The electric motor 120 is drivingly connected to the ring wheel 16 through a drive gear 123, and is axially movable by means of a suitable actuator (not shown). Drive engine 74 is drivingly connected through a clutch 122 to the first sun wheel 12a of the planetary roller transmission 50. The second sun wheel 12b of the planetary roller transmission is non-rotatably connected to output shaft 102. A large variety of drive configurations can be achieved, depending upon the actuation of the two motors, the position of the ring wheel 16, and the engagement state of the clutch 122.

The arrangement shown in FIG. 18 differs from that of FIG. 17 in that the rotation of electric motor 120 and hence that of ring wheel 16 can be blocked by a suitable blocking means 114. The clutch 122 of FIG. 17 can be eliminated in this arrangement.

Figure 19:
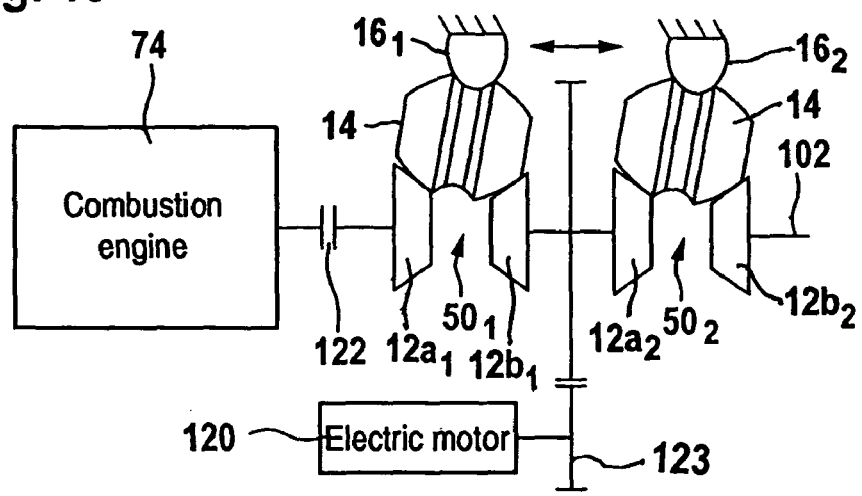

FIG. 19 shows the use of two planetary roller transmissions $50_1$ and $50_2$ in a power-branched hybrid drive. Internal combustion engine 74 is connected through a clutch 122 to the first sun wheel $12a_1$ of the first planetary roller transmission $50_1$, whose second sun wheel $12b_1$ is non-rotatably to the first sun wheel $12a_2$ of a second planetary roller transmission $50_2$, whose second sun wheel $12b_2$ is non-rotatably connected to the output shaft 102. The ring wheels $16_1$ and $16_2$ of both planetary roller transmissions are held stationary, and are axially movable by means of a common actuator (not shown) or by separate actuators. Electric motor 120 is operatively connected to the second sun wheel $12b_1$ of the planetary roller transmission $50_1$ or to the first sun wheel $12a_2$ of the planetary roller transmission $50_2$. With the arrangement shown in FIG. 19 it is possible to achieve a high overall transmission ratio spread of the transmission, while the transmission ratio spread of the individual planetary roller transmissions is small.

Figure 20:
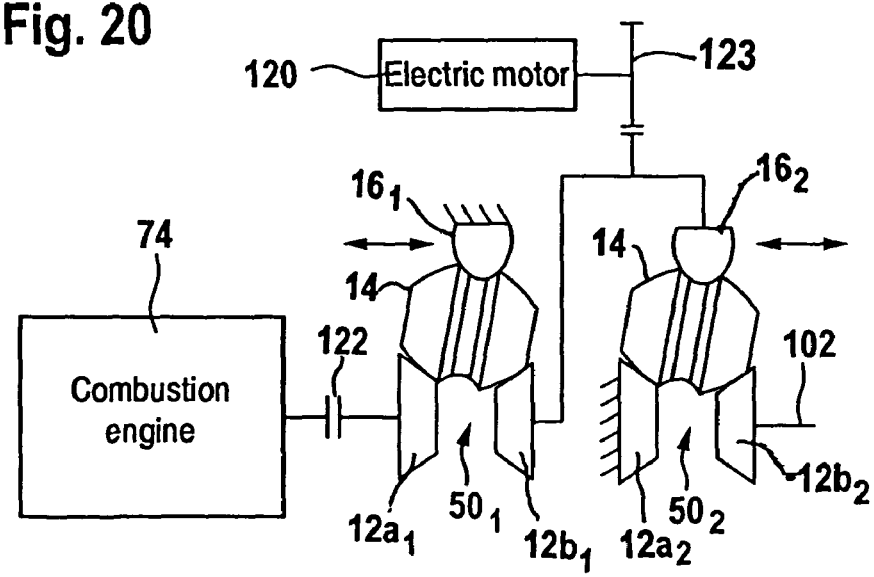

In the arrangement shown in FIG. 20 the two planetary roller transmissions $50_1$ and $50_2$ are not connected one after the other through the sun wheels $12b_1$ and $12a_2$, but rather the second sun wheel $12b_1$ of the first planetary roller transmission $50_1$ is non-rotatably connected to the ring wheel $16_2$ of the second planetary roller transmission $50_2$, whose second sun wheel $12b_2$, in turn, is non-rotatably connected to the output shaft 102. The ring wheel $16_1$ of the first planetary roller transmission $50_1$ is held so that it cannot rotate. The first sun wheel $12a_2$ of the second planetary roller transmission $50_2$ is likewise held so that it cannot rotate. Once again, it is possible to achieve a large transmission ratio spread of the overall transmission ratio, while the transmission ratio spread of the individual planetary roller transmissions is smaller.

Figure 21:
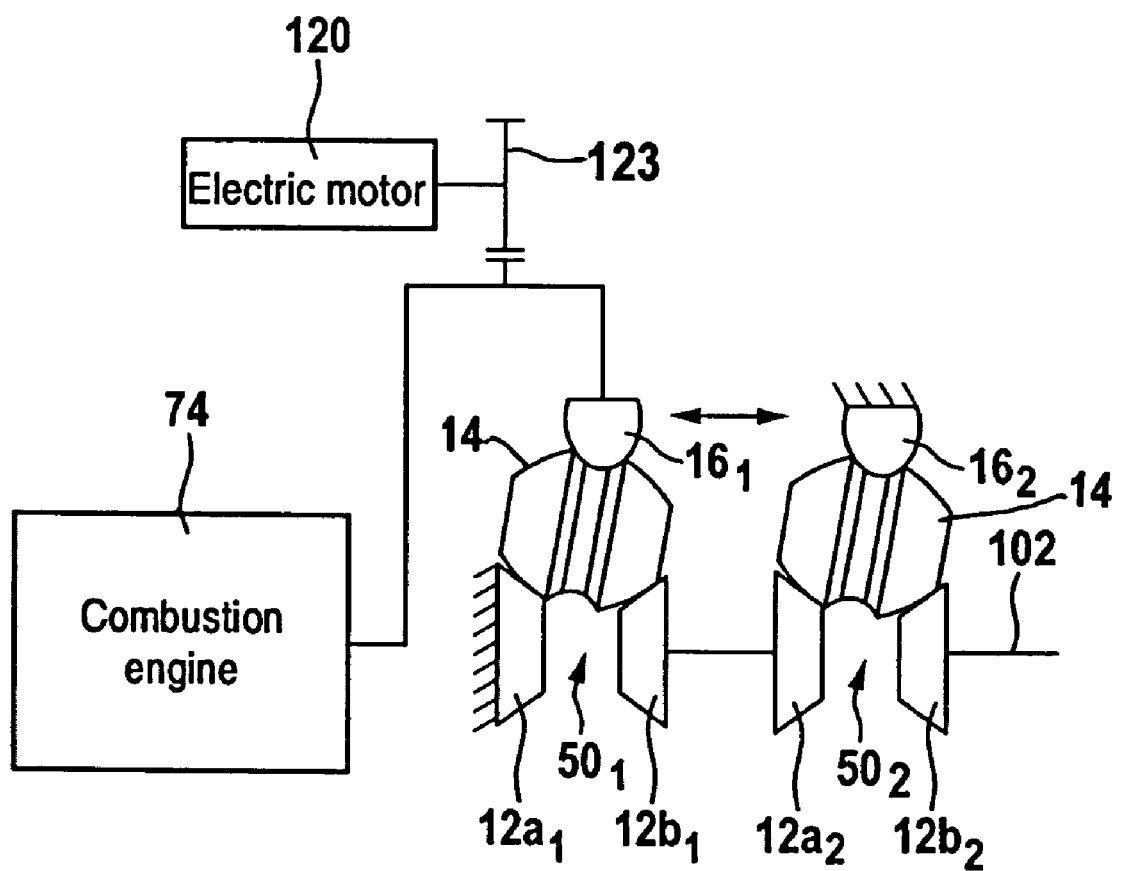

FIG. 21 shows another modified arrangement of a hybrid drive with two planetary roller transmissions $50_1$ and $50_2$. In that arrangement the drive engine 74, preferably in the form of an internal combustion engine, and the electric motor 120 are both drivingly connected to the ring wheel $16_1$ of the planetary roller transmission $50_1$, whose second sun wheel $12b_1$ is drivingly connected to the first sun wheel $12a_2$ of the planetary roller transmission $50_2$. The ring wheel $16_2$ of the second planetary roller transmission $50_2$ and the first sun wheel $12a_1$ of the first planetary roller transmission $50_1$ are held so that they cannot rotate. Again, it is possible to achieve a high transmission ratio spread of the overall transmission while the transmission ratio spread of the individual transmissions is small.

In the embodiments shown in FIGS. 20 and 21, a reversal of the direction of rotation, i.e., forward and reverse travel, is possible because one of the sun wheels is fixed in each case. The ring wheels of both planetary roller transmissions can again be operated by their own actuators or by a common actuator.

The actuators for adjusting the ring wheel can be designed in a great variety of ways, and act together with the ring wheel, if the latter is rotatable, through thrust bearings. The actuators can be formed, for example, by a linearly movable component through an electric motor having a rotatable spindle, a magnet that is controllable with regard to its stroke, a hydraulic unit, etc.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. An adjusting device with a CVT planetary roller transmission which has two sun wheels that are rotatable at an axial distance from each other around the same axis of rotation at different speeds, designed with sun wheel peripheral surfaces, a ring wheel with a radially inner peripheral surface and planet wheels with planet wheel peripheral surfaces that are in frictional contact with the inner peripheral surface and the sun wheel peripheral surfaces, wherein the surfaces that are in frictional contact with each other are shaped so that when there is an axial shift of the ring wheel relative to the sun wheels and an accompanying tilting of the axes of rotation of the planet wheels a difference in speed of rotation between the sun wheels changes, wherein the first sun wheel is rotationally drivable by a drive engine, the ring wheel is axially movable by an actuator and is rotationally drivable by an electric motor, and the second sun wheel rotationally drives an output shaft.

2. An adjusting device in accordance with claim 1, wherein a clutch is situated between the drive engine and the first sun wheel.

3. An adjusting device in accordance with claim 1, wherein the rotation of the ring wheel and of the electric motor is blockable.

* * * * *